United States Patent
Bacon et al.

(10) Patent No.: US 7,805,245 B2
(45) Date of Patent: Sep. 28, 2010

(54) INERTIAL MEASUREMENT UNIT FAULT DETECTION ISOLATION RECONFIGURATION USING PARITY LOGIC

(75) Inventors: Robert R. Bacon, Dunedin, FL (US); Zygmunt Zubkow, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 800 days.

(21) Appl. No.: 11/736,825

(22) Filed: Apr. 18, 2007

(65) Prior Publication Data

US 2008/0262729 A1    Oct. 23, 2008

(51) Int. Cl.
G01C 21/28 (2006.01)
G06F 7/00 (2006.01)

(52) U.S. Cl. .......... 701/220; 701/216; 342/357.06
(58) Field of Classification Search .......... 701/220, 701/216, 3, 4; 342/357.06
See application file for complete search history.

(56) References Cited

U.S. PATENT DOCUMENTS

| | | | |
|---|---|---|---|
| 2002/0008661 A1* | 1/2002 | McCall et al. | 342/357.14 |
| 2005/0060093 A1* | 3/2005 | Ford et al. | 701/214 |
| 2005/0090947 A1* | 4/2005 | Wise | 701/6 |
| 2005/0114023 A1 | 5/2005 | Williamson et al. | |
| 2006/0074558 A1 | 4/2006 | Williamson et al. | |
| 2007/0016371 A1* | 1/2007 | Waid et al. | 701/213 |

* cited by examiner

Primary Examiner—Tan Q Nguyen
(74) Attorney, Agent, or Firm—Fogg & Powers LLC

(57) ABSTRACT

A method of implementing a fault-tolerant-avionic architecture in a vehicle includes using parity logic to monitor the functionality of at least three non-fault-tolerant inertial measurement units during a parity check and calculating a threshold from expected inertial measurement unit performance during a parity check. If a failure of an inertial measurement unit is detected based on the calculated threshold, then the method further includes identifying the failed inertial measurement units based on a direction of a parity vector in parity space. Each inertial measurement unit comprises at least one triad of sensors.

20 Claims, 6 Drawing Sheets

INERTIAL MEASUREMENT UNIT FAULT DETECTION ISOLATION RECONFIGURATION USING PARITY LOGIC

BACKGROUND

When inertial measurement units are used to track vehicles, such as aircrafts or guided missiles, a failure in the one of the inertial measurement units can cause the vehicle to veer off track. When mission success is critical, the tolerance for failure is reduced to zero. The inertial measurement units that are fault tolerant are very expensive so the cost of systems that require fault tolerant inertial measurement units can be prohibitive, especially in vehicles which are only able to be used one time, such as missiles.

SUMMARY

In a first embodiment, a method of implementing a fault-tolerant-avionic architecture in a vehicle is provided. The method includes using parity logic to monitor the functionality of at least three non-fault-tolerant inertial measurement units during a parity check, calculating a threshold from expected inertial measurement unit performance during a parity check. If a failure of an inertial measurement unit is detected based on the calculated threshold, then identifying the failed inertial measurement units based on a direction of a parity vector in parity space. Each inertial measurement unit comprises at least one triad of sensors.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
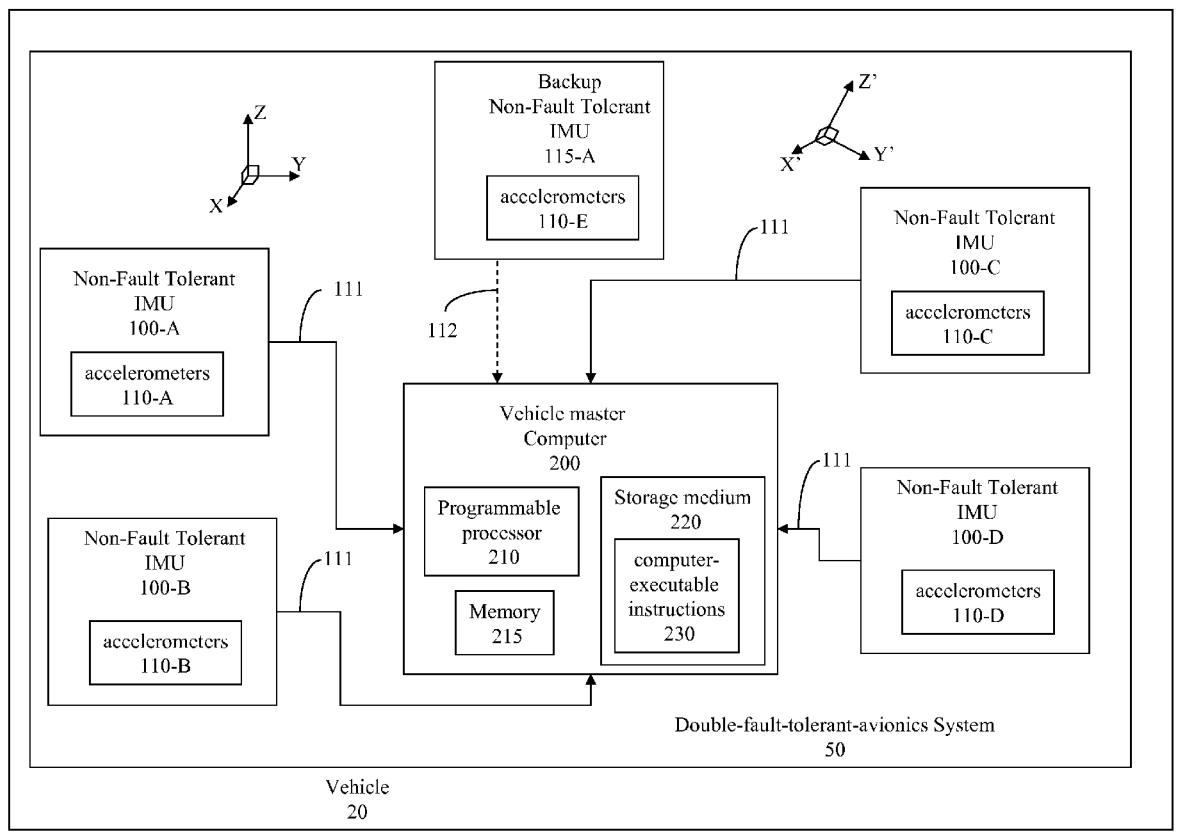
FIGS. 1-3 are block diagrams representative of embodiments of double-fault-tolerant-avionics systems in a vehicle.
Figure 2:
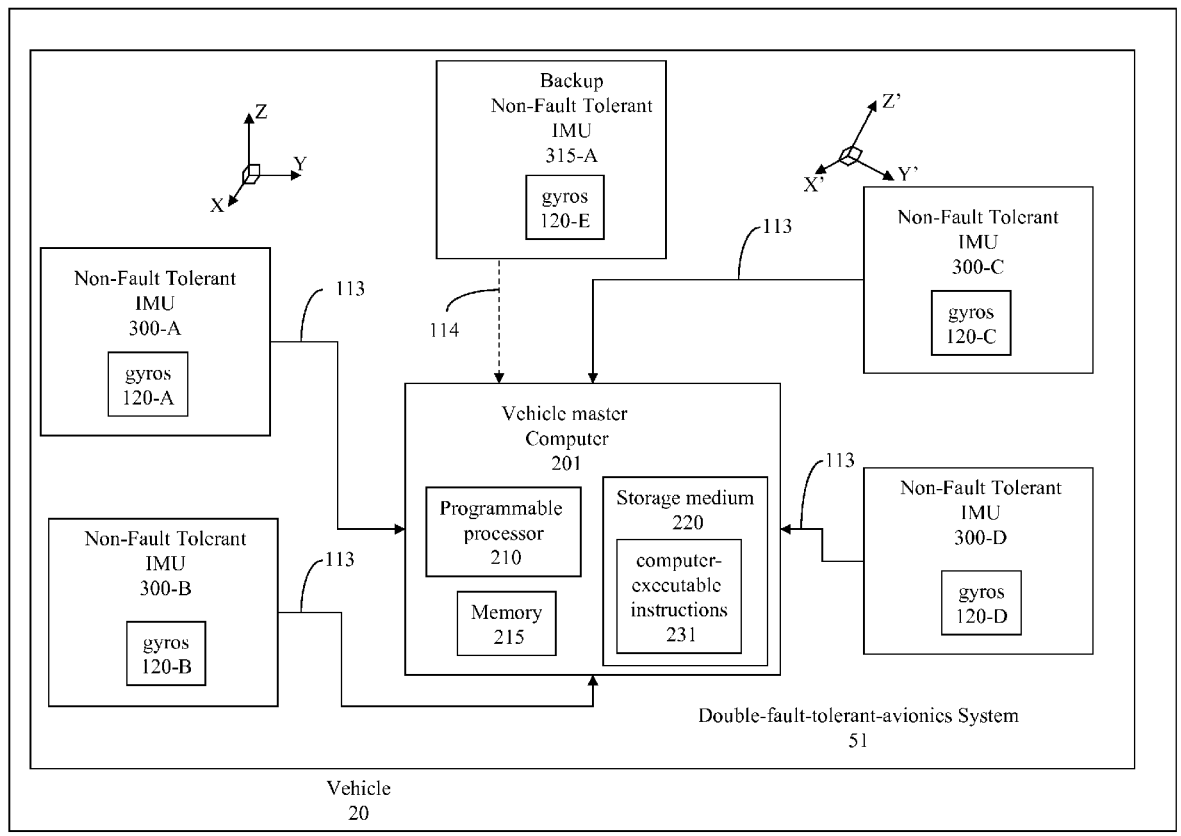
Figure 3:
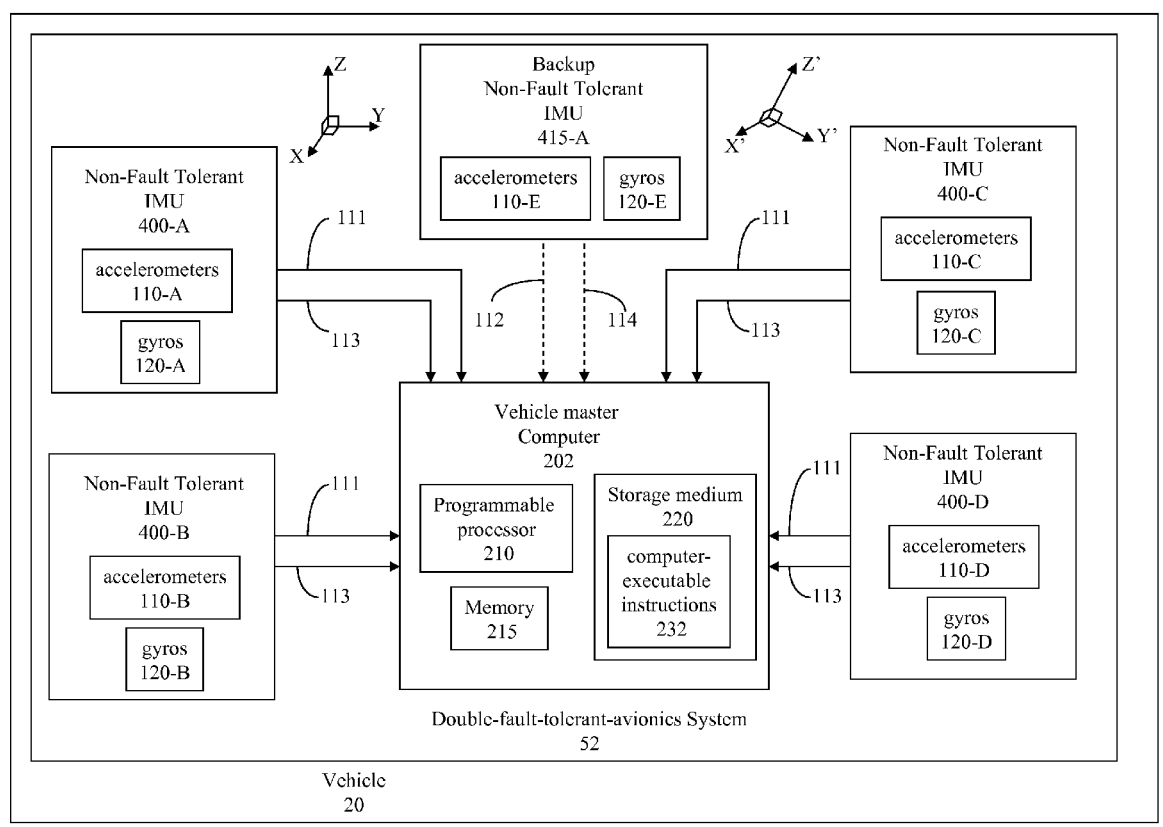

FIGS. 1-3 are block diagrams representative of embodiments of double-fault-tolerant-avionics systems in a vehicle. The double-fault-tolerant-avionics architecture of the double-fault-tolerant-avionics system in the vehicle permits use of the double-fault-tolerant-avionics system after one inertial measurement unit 100-$i$ of the four inertial measurement units 100 (A-D) fails. Only if a second of the four inertial measurement units fails, does the double-fault-tolerant-avionics system stop functioning. In one implementation of this embodiment, a backup inertial measurement unit is used to permit continued use of the double-fault-tolerant-avionics system.

FIG. 1 is a block diagram representative of one embodiment of a double-fault-tolerant-avionics system 50 in a vehicle 20. The double-fault-tolerant-avionics architecture of the double-fault-tolerant-avionics system 50 in the vehicle 20 permits use of the double-fault-tolerant-avionics system 50 after one inertial measurement unit 100-$i$ of the four inertial measurement units 100 (A-D) fails.

The double-fault-tolerant-avionics system 50 includes a vehicle master computer 200, four non-fault-tolerant inertial measurement units 100 (A-D) and a backup non-fault-tolerant inertial measurement unit 115-A. The non-fault-tolerant inertial measurement units 100 (A-D) are also referred to herein as "inertial measurement units 100 (A-D)." The non-fault-tolerant inertial measurement units 100 (A-D) and the backup inertial measurement unit 115-A are single-string non-fault tolerant units. A single failure in a single-string inertial measurement unit results in a failure of the entire inertial measurement unit.

Each non-fault-tolerant inertial measurement unit 100 (A-D) includes a respective triad of accelerometers 110 (A-D). Each triad of accelerometers 110 includes three acceleration sensors. The acceleration sensors that form one triad are orthogonally aligned with respect to each other in order to measure the acceleration in each of the three orthogonal directions, such as the axes represented by the vectors X, Y and Z or the axes represented by the vectors X', Y' and Z'. The acceleration sensors that form the triads are attached to a mounting frame of the vehicle 20 so that they experience the same acceleration as the vehicle 20.

The triad of accelerometers 110-$i$ can have a different orientation or the same orientation as the triad of accelerometers 110-$j$. For example, the triad of accelerometers 110-A and 100-B can be aligned with the vectors X, Y and Z, the triad of accelerometers 110-C can be aligned with the vectors X', Y' and Z' and the triad of accelerometers 110-D and 110-E can be aligned with other sets of orthogonal vectors. In another implementation of this embodiment, the triad of accelerometers 110 (A-E) are all aligned to the same axes, such as the axes parallel to vectors X, Y and Z.

The vehicle 20 can be a satellite, a missile, a jet, an airplane, a helicopter and any other type of airborne vehicle. The non-fault tolerant accelerometers 110 can be commercial off the shelf (COTS) devices, a micro-electro-mechanical system (MEMS) accelerometer, such as a Honeywell BG1930 MEMS Inertial Measurement Unit (IMU), QA-2000 and QA-3000 pendulous mass accelerometers, SFIR and PIGA pendulous integrating gyro accelerometers, and other types of accelerometers.

In one implementation of this embodiment, the double-fault-tolerant-avionics system 50 includes more than four non-fault-tolerant inertial measurement units 100 (A-N). In another implementation of this embodiment, the double-fault-tolerant-avionics system 50 includes more than one backup non-fault-tolerant inertial measurement units 115 (A-M). In yet another implementation of this embodiment, the double-fault-tolerant-avionics system 50 does not include a backup non-fault-tolerant inertial measurement unit 115-A.

The vehicle master computer 200 includes a programmable processor 210, a memory 215, and at least one storage medium 220. The programmable processor 210 in the vehicle master computer 200 receives input from the inertial measurement units 100 (A-D) via connections 111. Specifically, the programmable processor 210 receives information indicative of acceleration of the vehicle 20 from a triad of accelerometers 110 (A-D) in each of the at least inertial measurement units 100 (A-D).

The vehicle master computer 200 is communicatively coupled to the backup inertial measurement unit 115-A via connection 112. The connection 112 can be used as required to send input from the back up inertial measurement unit 115-A to the programmable processor 210 in the event that one of the inertial measurement units 100 (A-D) fails. The connections 111 and 112 can be trace lines, wires, optical communication links or radio frequency links.

The programmable processor 210 executes the computer-executable instructions 230 stored in the storage medium 220. The computer-executable instructions 230 comprises various elements of software, each including the computer code, variable storage, control logic, and software interfaces that allow the vehicle master computer 200 to interact with the inertial measurement units 100 and 115. The programmable processor 210 executes software and/or firmware that causes the programmable processor 210 to perform at least some of the processing described here as being performed by the vehicle master computer 200 and/or the programmable processor 210. At least a portion of such software and/or firmware executed by the programmable processor 210 and any related data structures are stored in memory 215 during execution. Memory 215 comprises any suitable memory now known or later developed such as, for example, random access memory (RAM), read only memory (ROM), and/or registers within the programmable processor 210.

In one implementation, the programmable processor 210 comprises a microprocessor or microcontroller. Moreover, although the programmable processor 210 and memory 215 are shown as separate elements in FIG. 1, in one implementation, the programmable processor 210 and memory 215 are implemented in a single device (for example, a single integrated-circuit device). The software and/or firmware executed by the programmable processor 210 comprises a plurality of program instructions that are stored or otherwise embodied on the storage medium 220 from which at least a portion of such program instructions are read for execution by the programmable processor 210. In one implementation, the programmable processor 210 comprises processor support chips and/or system support chips such as application-specific integrated circuits (ASICs).

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

The computer-executable instructions 230 and/or firmware executing on the programmable processor 210 processes the acceleration information received from the inertial measurement units 100 (A-D) and uses the received information to monitor the functionality of the non-fault-tolerant inertial measurement units 100 (A-D) using parity logic.

The programmable processor 210 is able to detect any failure of any one of the inertial measurement units 100 (A-D) based on a threshold calculated from expected inertial measurement unit performance during a parity check. The programmable processor 210 is able to identify the failed inertial measurement unit 100-$i$ based on a direction of a parity vector in parity space. When a failure is detected, the programmable processor 210 suspends operation of the failed inertial measurement unit 100-$i$.

In one implementation of this embodiment, when a failure is detected, the programmable processor 210 operates the backup inertial measurement unit 115-A in the fault tolerant-avionic system 50 to track the vehicle 20 and continues to use parity logic to monitor the functionality of operational measurement units using the fully functioning inertial measurement units 100 (j-l) and the backup inertial measurement unit.

In another implementation of this embodiment, the programmable processor continues to use parity logic to monitor the health and functionality of the three remaining fully functioning measurement units 100 (without the use of the backup inertial measurement unit 115-A so that three fully functioning inertial measurement units 100 (j-l) are used to track the vehicle 20 after the failure. In this case, if a second inertial measurement unit fails, the second failure is detected by the programmable processor 210. Then the programmable processor 210 is required to operate the backup inertial measurement unit 115-A in the fault tolerant-avionic system 50 in order to continue to use parity logic to monitor the functionality of operational measurement units so that the two fully functioning inertial measurement units 100 (j-k) and the backup inertial measurement unit 115-A, which is also fully functioning, are used to track the vehicle 20 after the second failure. If there are additional backup inertial measurement units 115, then the double-fault-tolerant-avionics system 50 can still operate with the programmable processor 210 monitoring the functionality of the fully functioning inertial measurement units 100 and the fully functioning backup inertial measurement units 115.

The software and the method by which the programmable processor functions is described below with reference to methods 500 and 600 of FIGS. 5 and 6, respectively.

FIG. 2 is a block diagram representative of one embodiment of a double-fault-tolerant-avionics system 51 in a vehicle 20. The double-fault-tolerant-avionics system 51 shown in vehicle 20 includes a vehicle master computer 201, four non-fault-tolerant inertial measurement units 300 (A-D) and a backup non-fault-tolerant inertial measurement unit 315-A. The non-fault-tolerant inertial measurement units 300 (A-D) are also referred to herein as "inertial measurement units 300 (A-D)."

Each non-fault-tolerant inertial measurement unit 300 (A-D) includes a respective triad of gyroscopes 120 (A-D), also referred to herein as "gyros 120 (A-D)." Each triad of gyros 120 includes three angular rate sensors (also referred to herein as "angular velocity sensors"). The rate sensors that form one triad are orthogonally aligned with respect to each other in order to measure the angular velocity of the vehicle 20 in each of the three orthogonal directions, such as the axes represented by the vectors X, Y and Z or the axes represented by the vectors X', Y' and Z'. The angular velocity sensors that form the triads are attached to the mounting frame of the vehicle 20 so that they move with the same angular velocity as the vehicle 20.

The triad of gyros 120-$i$ can have a different orientation or the same orientation as the triad of gyros 120-$j$. For example, the triad of gyros 120-A and 120-B can be aligned with the vectors X, Y and Z, the triad of gyros 120-C can be aligned with the vectors X', Y' and Z' and the triad of gyros 120-D and 120-E can be aligned with other sets of orthogonal vectors. In another implementation of this embodiment, the triad of gyros 120 (A-E) are all aligned to the same axes, such as the axes parallel to vectors X, Y and Z.

The non-fault tolerant gyroscopes 120 are commercial off the shelf (COTS) devices, a micro-electro-mechanical system (MEMS) gyro, laser gyros, fiber optic gyros, single and dual degree of freedom spinning wheel gyros, or other types of gyro.

In one implementation of this embodiment, the double-fault-tolerant-avionics system 51 includes more than four non-fault-tolerant inertial measurement units 300 (A-N). In another implementation of this embodiment, the double-fault-tolerant-avionics system 51 includes more than one backup non-fault-tolerant inertial measurement units 315 (A-M). In yet another implementation of this embodiment, the double-fault-tolerant-avionics system 51 does not include a backup non-fault-tolerant inertial measurement unit 315A.

The vehicle master computer 201 has the same structure and function as the vehicle master computer 200 described above with reference to FIG. 1 except that vehicle master computer 201 includes computer-executable instructions 231 rather than computer-executable instructions 230. The programmable processor 210 in the vehicle master computer 201 receives input from the inertial measurement units 300 (A-D) via connections 113. Specifically, the programmable processor 210 receives computer-executable instructions 231 of the vehicle 20 from the triad of gyros 120 (A-D) in each of the at least inertial measurement units 300 (A-D).

The vehicle master computer 201 is communicatively coupled to the backup inertial measurement unit 315-A via connection 114. The connection 114 can be used as required to send input from the back up inertial measurement unit 315-A to the programmable processor 210 in the event that one of the inertial measurement units 300 (A-D) fails. The connections 113 and 114 can be trace lines, wires, optical communication links or radio frequency links.

The programmable processor 210 executes the computer-executable instructions 231 stored in the storage medium 220. The computer-executable instructions 231 comprises various elements of software, each including the computer code, variable storage, control logic, and software interfaces that allow the vehicle master computer 201 to interact with the inertial measurement units 300 and 315. The programmable processor 210 executes software and/or firmware that causes the programmable processor 210 to perform at least some of the processing described here as being performed by the vehicle master computer 201 and/or the programmable processor 210. At least a portion of such software and/or firmware executed by the programmable processor 210 and any related data structures are stored in memory 215 during execution.

The computer-executable instructions 231 and/or firmware executing on the programmable processor 210 processes the angular rate information received from the inertial measurement units 300 (A-D) and uses the received information to monitor the functionality of the non-fault-tolerant inertial measurement units 300 (A-D) using parity logic. The programmable processor 210 is able to detect any failure of any one of the inertial measurement units 300 (A-D) based on a threshold calculated from expected inertial measurement unit performance during a parity check. The programmable processor 210 is able to identify the failed inertial measurement unit 300-$i$ based on a direction of a parity vector in parity space. When a failure is detected, the programmable processor 210 suspends operation of the failed inertial measurement unit 300-$i$.

In one implementation of this embodiment, when a failure is detected, the programmable processor 210 operates the backup inertial measurement unit 115-A in the fault tolerant-avionic system 51 to track the vehicle 20 and continues to use parity logic to monitor the functionality of operational inertial measurement units 300 (j-l) using the fully functioning inertial measurement units 300 (j-l) and the backup inertial measurement unit 315-A.

In another implementation of this embodiment, the programmable processor continues to use parity logic to monitor the functionality of the three remaining operational measurement units 300 (without the use of the backup inertial measurement unit 315-A so that three fully functioning inertial measurement units 300 (j-l) are used to track the vehicle 20 after the failure. In this case, if a second inertial measurement unit fails, the second failure is detected by the programmable processor 210. Then the programmable processor 210 is required to operate the backup inertial measurement unit 315-A in the fault tolerant-avionic system 51 in order to continue to use parity logic to monitor the functionality of operational measurement units so that the two fully functioning inertial measurement units 300 (j-k) and the backup inertial measurement unit 315-A are used to track the vehicle 20 after the second failure. If there are additional backup inertial measurement units 315, then the double-fault-tolerant-avionics system 51 can still operate with the programmable processor 210 monitoring the functionality of the fully functioning inertial measurement units 300 and the fully functioning backup inertial measurement units 315.

The software and the method by which the programmable processor functions is described below with reference to methods 500 and 600 of FIGS. 5 and 6, respectively.

FIG. 3 is a block diagram representative of one embodiment of a double-fault-tolerant-avionics system 52 in a vehicle 20. The double-fault-tolerant-avionics system 52 shown in vehicle 20 includes a vehicle master computer 202, four non-fault-tolerant inertial measurement units 400 (A-D) and a backup non-fault-tolerant inertial measurement unit 415-A. The non-fault-tolerant inertial measurement units 400 (A-D) are also referred to herein as "inertial measurement units 400 (A-D)."

Each non-fault-tolerant inertial measurement unit 400 (A-D) includes a respective triad of accelerometers 110 (A-D) and triad of gyroscopes 120 (A-D). Each triad of gyros 120 and the triad of accelerometers 110 in each inertial measurement unit 400 can be aligned to the same or different set of orthogonal axes, such as the axes represented by the vectors X, Y and Z and/or the axes represented by the vectors X', Y' and Z'. The angular velocity sensors and accelerometers that form the triad of sensors are attached to the mounting frame of the vehicle 20 so that they move at the same angular rate and with the same acceleration as the vehicle 20.

In one implementation of this embodiment, the double-fault-tolerant-avionics system 52 includes more than four non-fault-tolerant inertial measurement units 400 (A-N). In another implementation of this embodiment, the double-fault-tolerant-avionics system 52 includes more than one backup non-fault-tolerant inertial measurement units 415 (A-M). In yet another implementation of this embodiment, the double-fault-tolerant-avionics system 52 does not include a backup non-fault-tolerant inertial measurement unit 415-A.

The vehicle master computer 202 has the same structure and function as the vehicle master computer 200 described above with reference to FIG. 1 except that the computer-executable instructions 230 in vehicle master computer 202 is replaced by computer-executable instructions 232. The programmable processor 210 in the vehicle master computer 201 receives input from the inertial measurement units 400 (A-D) via connections 111 and 113. Specifically, the programmable processor 210 receives information indicative of acceleration of the vehicle 20 from a triad of accelerometers 110 (A-D) in each of the at least inertial measurement units 400 (A-D) and receives information indicative of angular rate of the vehicle 20 from the triad of gyros 120 (A-D) in each of the at least inertial measurement units 400 (A-D).

The vehicle master computer 202 is communicatively coupled to the backup inertial measurement unit 415-A via connections 112 and 114. The connections 112 and 114 can be used as required to send input from the back up inertial measurement unit 415-A to the programmable processor 210 in the event that one of the inertial measurement units 400 (A-D) fails. If either one of the accelerometers or the gyros fails in an inertial measurement unit 400-i, the inertial measurement unit 400-i is considered a failure and information indicative of both the acceleration and the rate of the vehicle is received from the backup inertial measurement unit 415-A.

The computer-executable instructions 232 and/or firmware executing on the programmable processor 210 processes the acceleration and rate information received from the inertial measurement units 400 (A-D) and uses the received information to monitor the functionality of the non-fault-tolerant inertial measurement units 400 (A-D) using parity logic. The programmable processor 210 is able to detect any failure of any one of the inertial measurement units 400 (A-D) based on a threshold calculated from expected inertial measurement unit performance during a parity check. The programmable processor 210 is able to identify the failed inertial measurement unit 400-i based on a direction of a parity vector in parity space. When a failure is detected, the programmable processor 210 suspends operation of the failed inertial measurement unit 400-i.

In one implementation of this embodiment, when a failure is detected, the programmable processor 210 operates the backup inertial measurement unit 115-A in the fault tolerant-avionic system 52 to track the vehicle 20 and continues to use parity logic to monitor the functionality of operational inertial measurement units 400 (j-l) using the fully functioning inertial measurement units 400 (j-l) and the backup inertial measurement unit 415-A.

In another implementation of this embodiment, the programmable processor continues to use parity logic to monitor the functionality of the three remaining operational measurement units 400 (without the use of the backup inertial measurement unit 415-A so that three fully functioning inertial measurement units 400 (j-l) are used to track the vehicle 20 after the failure. In this case, if a second inertial measurement unit fails, the second failure is detected by the programmable processor 210. Then the programmable processor 210 is required to operate the backup inertial measurement unit 415-A in the fault tolerant-avionic system 52 in order to continue to use parity logic to monitor the functionality of operational measurement units so that the two fully functioning inertial measurement units 400 (j-k) and the backup inertial measurement unit 415-A are used to track the vehicle 20 after the second failure. If there are additional backup inertial measurement units 415, then the double-fault-tolerant-avionics system 52 can still operate with the programmable processor 210 monitoring the functionality of the fully functioning inertial measurement units 400 and the fully functioning backup inertial measurement units 415.

The software and the method by which the programmable processor functions is described below with reference to methods 500 and 600 of FIGS. 5 and 6, respectively.

Figure 4:
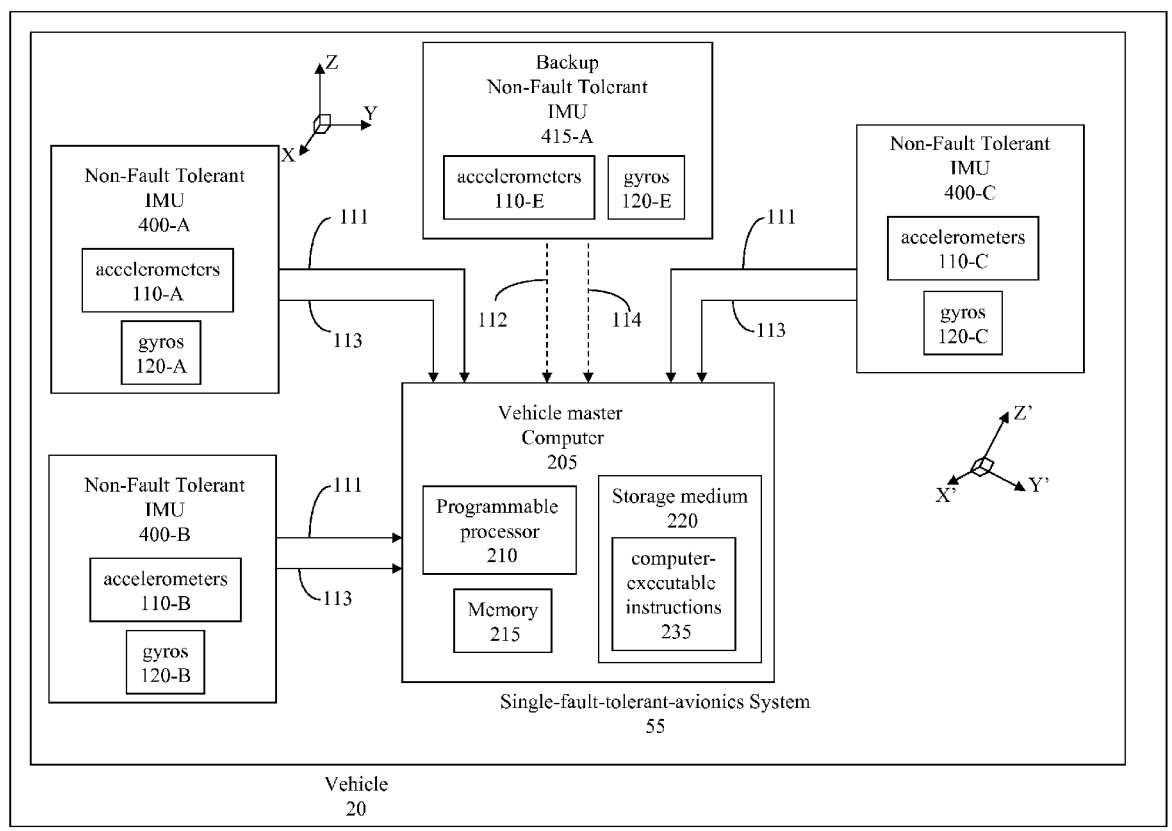
FIG. 4 is a block diagram representative of one embodiment of a single-fault-tolerant-avionics system in a vehicle.

FIG. 4 is a block diagram representative of one embodiment of a single-fault-tolerant-avionics system 55 in a vehicle 20. The single-fault-tolerant-avionics system 55 differs from the double-fault-tolerant-avionics system 52 of FIG. 3 in that there are only three non-fault tolerant inertial measurement units 400. Computer-executable instructions 235 are implemented by the programmable processor 210 to determine a failure of an inertial measurement unit 400 (A-C). If a failure is detected in one of the inertial measurement units 400 in single-fault-tolerant-avionics system 55, then the backup inertial measurement unit 415-A is automatically used by the programmable processor 210 to monitor the functionality of the inertial measurement units 400 as is understandable from the above description of the inertial measurement units 400.

The details about the computer-executable instructions executed by the programmable processor 210 to monitor the IMU functionality in a vehicle 20 using a fault-tolerant-avionic architecture is now described. An algorithmic coverage (parity logic) is used to detect and isolate a failed inertial measurement unit 100 and to rank order the inertial measurement units 100 (A-D) (FIG. 1). The logic is implemented downstream of the inertial measurement units 100 (A-D) in the vehicle master computer 200. The method uses a magnitude squared of the sensed accelerations (and/or sensed rates) of the mounting frame for the inertial measurement units 100 (A-D) as the measurements. The use of the magnitude squared as the measurement allows for arbitrary relative orientation of the inertial measurement unit mounting frames. The use of the magnitude squared as the measurement also removes any orthogonal rotation errors between the inertial measurement unit mounting axes as an error source in the parity computations.

A threshold is calculated from the expected inertial measurement unit performance and the measurements are compared to the threshold. If the measurements exceed the threshold, one of the inertial measurement units has failed. The direction of the vector formed from the measurements in parity space points to the failed inertial measurement unit in parity space. Then programmable processor 210 in the vehicle master computer 200 is thereby able to determine which of the inertial measurement units 100 (A-D) has failed.

The following assumptions are used in the calculations performed by the computer-executable instructions: data from the four inertial measurement units are fully compensated and time coherent, the sensed acceleration data has been resolved to a common point using appropriate lever arm corrections, the body of the vehicle 20 is assumed to be sufficiently rigid so that vehicle flexing does not cause significant differences in sensed rates at the various inertial measurement unit locations. If the latter assumption is not valid then the rate differences will be accounted for in the rate parity fault detection thresholds. The algorithmic coverage of faults described herein is extendable to detect and isolate a second fault in three inertial measurement units 100 (A-C) that were operational after a failure of a first inertial measurement unit 110-D. Parity logic is suspended after a second inertial measurement unit failure.

In one implementation of this embodiment, a backup inertial measurement unit 115-A is implemented after the failure of a first inertial measurement unit 110-D. In another implementation of this embodiment, a backup inertial measurement unit 115-A is implemented after a second failure of a second inertial measurement unit so that parity logic is not suspended after a second inertial measurement unit failure.

Figure 5:
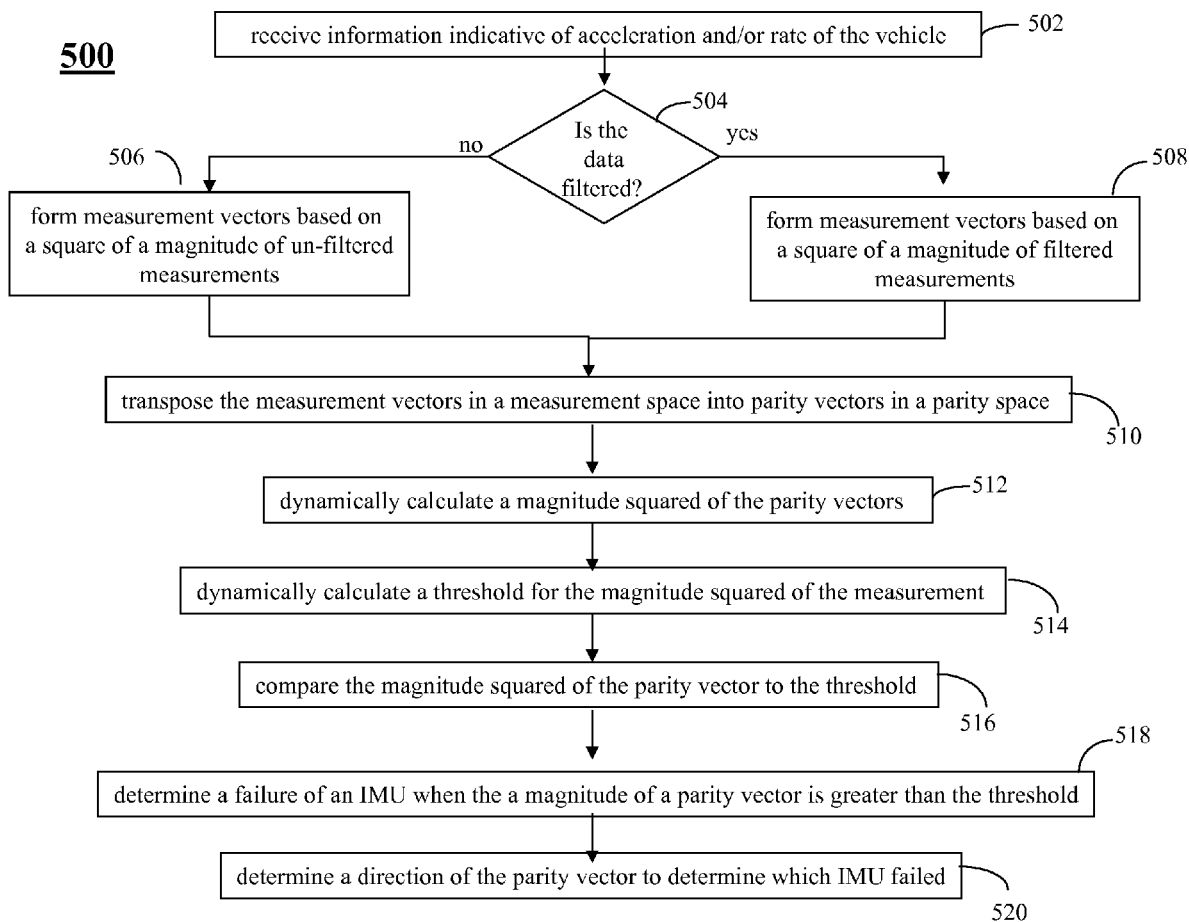
FIG. 5 is a flow diagram of one embodiment of a method to use parity logic to monitor the functionality of at least three non-fault-tolerant inertial measurement units, each inertial measurement unit comprising at least one triad of sensors in accordance with the present invention.

FIG. 5 is a flow diagram of one embodiment of a method 500 to use parity logic to monitor the functionality of at least three non-fault-tolerant inertial measurement units, each inertial measurement unit comprising at least one triad of sensors in accordance with the present invention. Method 500 is described with reference to the double-fault-tolerant-avionics systems 50-55 of FIGS. 1-4. Computer-executable instructions 230, such as software, firmware or other program code for performing the methods described herein are executed by the programmable processor 210 of the vehicle master computer 200.

At step 502, the programmable processor receives information indicative of measurements, such as acceleration and/or angular rate of the vehicle 20, via connections 111 and/or 113. If the double-fault-tolerant-avionics system is the double-fault-tolerant-avionics system 50 of FIG. 1, the programmable processor 210 receives information indicative of acceleration of the vehicle 20. If the double-fault-tolerant-avionics system is the double-fault-tolerant-avionics system 51 of FIG. 2, the programmable processor 210 receives information indicative of angular rate of the vehicle 20. If the double-fault-tolerant-avionics system is the double-fault-tolerant-avionics system 52 of FIG. 3, the fully compensated sensed mounting frame incremental velocity are read from the triad of gyroscopes 120 (A-D) and the fully compensated sensed mounting frame accelerations are read from the triad of accelerometers 110 (A-D) in the respective inertial measurement units 400 (A-D).

At step 504, it is determined if the information indicative of measurements is filtered. Filtering is used to reduce the noise level of the data. If a low pass filter is used with a long time constant the filter is heavy filtering and the noise is greatly reduced. Heavily filtered data is used to determine "soft failures" in which the performance of the inertial measurement unit gradually deteriorates. If no filter is used, then the programmable processor 210 is able to detect a "hard failure" or a "catastrophic failure," in which the performance of the inertial measurement unit suddenly deteriorates significantly. In one implementation of this embodiment, of a catastrophic failure, the inertial measurement unit stops functioning. In one implementation of this embodiment, the filtering is a first order finite impulse response (FIR) filter algorithm implemented by the programmable processor 210 to filter the information indicative of measurements received.

The filtering algorithms are shown below as equations (1A) and (1B):

$$p1_i := (1\ 0\ 0) \cdot pi,$$

$$p2_i := (0\ 1\ 0) \cdot pi, \text{ and}$$

$$p3_i := (0\ 0\ 1) \cdot pi, \quad (1A)$$

which are inserted into the following equations (1B):

$$p_{1f} := sup\ \text{smooth}\left(\frac{t}{\text{sec}}, \frac{p_1}{g^2}\right),$$

$$p_{2f} := sup\ \text{smooth}\left(\frac{t}{\text{sec}}, \frac{p_2}{g^2}\right), \text{ and}$$

$$p_{3f} := sup\ \text{smooth}\left(\frac{t}{\text{sec}}, \frac{p_3}{g^2}\right), \text{ where}$$

$$pf_i := \begin{pmatrix} p1f_i \\ p2f_i \\ p3f_i \end{pmatrix} \cdot g^2 \quad (1B)$$

If the information is not filtered, the flow proceeds to step 506. At step 506, measurement vectors are formed based on a square of the magnitude of the unfiltered information indicative of measurements received from at least three inertial measurement units. The equations shown herein, other than equation 39, are shown for the acceleration measurements but they are extendable to include angular velocity as is understandable based on a reading of this specification and a skill in the art.

If information indicative of acceleration is received at the programmable processor 210, the programmable processor 210 squares and sums the sensed acceleration from each accelerometer in each direction (such as X, Y, and Z). In this manner, an acceleration measurement $m_i$ is formed for each inertial measurement unit as shown in equation (1C).

$$f_A^2 = (f_{AX}^2 + f_{AY}^2 + f_{AZ}^2)\ m_1 = f_A^2$$

$$f_B^2 = (f_{BX}^2 + f_{BY}^2 + f_{BZ}^2)\ m_2 = f_B^2$$

$$f_C^2 = (f_{CX}^2 + f_{CY}^2 + f_{CZ}^2)\ m_3 = f_C^2$$

$$f_D^2 = (f_{DX}^2 + f_{DY}^2 + f_{DZ}^2)\ m_4 = f_D^2 \quad \text{Equation (1C)}$$

The measurement vector is the measurement from each of the accelerometers. The measurement vector is a (4×1) vector comprising $m_1$, $m_2$, $m_3$, and $m_4$ when there are four inertial measurement units each with a triad of accelerometers. The measurement vector is a (3×1) vector comprising $m_1$, $m_2$, and $m_3$ when there are three inertial measurement units each with a triad of accelerometers.

If information indicative of angular velocity is received at the programmable processor 210, the programmable processor 210 squares and sums the sensed velocity for each direction (such as X, Y, and Z) to form a velocity measurement $m_i$. The measurement vector is a (4×1) vector when there are four inertial measurement units with a triad of gyros. The measurement vector is a (3×1) vector when there are three inertial measurement units each with a triad of gyros.

Likewise, if information indicative of both acceleration and angular velocity is received at the programmable processor 210, the programmable processor 210 squares and sums the sensed acceleration and squares and sums sensed angular velocity for each direction (such as X, Y, and Z) to form a measurement. There are two 4×1 measurements vectors when there are four IMUs in use. There are two 3×1 measurement vectors when there are three IMUs in use.

If the information is filtered, the flow proceeds to step 508 from step 504. At step 508, measurement vectors are formed based on a square of the magnitude of the filtered information indicative of measurements received from the at least three inertial measurement units. The description above made with reference to step 506 is applicable to this step 508, except the measurements in equation (1C) are the filtered measurements.

At step 510, the measurement vectors are transposed from the measurement space to a parity space. Equations (2)-(9) show the method used to transpose the measurement vectors into parity space. This step and the following steps are implemented on the vectors generated from the unfiltered data if the flow has proceeded from step 506. Likewise, this step and the following steps are implemented on the vectors generated from the filtered data if the flow has proceeded from step 508.

$$m = H \cdot x + \text{noise} \quad (2)$$

$$x = f^2 \quad (3)$$

$$H = \begin{pmatrix} 1 \\ 1 \\ 1 \\ 1 \end{pmatrix} \quad (4)$$

$$H^* := (H^T \cdot H)^{-1} \cdot H^T \quad (5)$$

-continued $$S = (H^T \cdot H)^{-1} \quad (6)$$

$$S_{inv} = (H^T \cdot H)^{-1} \quad (7)$$

$$S_{inv} = 0.25 \quad (8)$$

$$H^* = (0.25 \; 0.25 \; 0.25 \; 0.25) \quad (9)$$

H* is the least square estimate matrix pseudo inverse.

$$H \cdot H^* = \begin{pmatrix} 0.25 & 0.25 & 0.25 & 0.25 \\ 0.25 & 0.25 & 0.25 & 0.25 \\ 0.25 & 0.25 & 0.25 & 0.25 \\ 0.25 & 0.25 & 0.25 & 0.25 \end{pmatrix} \quad (10)$$

$$W = I(4) - H \cdot H_{str} \quad (11)$$

The "I(4)" term represents a 4×4 identity matrix.

$$W = \begin{pmatrix} 0.75 & -0.25 & -0.25 & -0.25 \\ -0.25 & 0.75 & -0.25 & -0.25 \\ -0.25 & -0.25 & 0.75 & -0.25 \\ -0.25 & -0.25 & -0.25 & 0.75 \end{pmatrix} \quad (12)$$

The parity coefficient matrix elements are derived from matrix W in equation (12). The measurement vectors in the measurement space are transposed into parity vectors in a parity using vector W of equation (12) to generate the vector V as shown in equations (13)-(17). Given that i includes values from 1 to 3 (for the three parity space directions) and j includes values from 1 to 4 (for the four measurement space directions) and $V_{i,j} := 0$ then V is a 3×4 matrix:

$$V = \begin{pmatrix} 0 & 0 & 0 & 0 \\ 0 & 0 & 0 & 0 \\ 0 & 0 & 0 & 0 \\ 0 & 0 & 0 & 0 \end{pmatrix}. \quad (13)$$

Letting $V_{1,1} := \sqrt{W_{1,1}}$ and $V_{2,2} := \sqrt{W_{2,2} - (V_{1,2})^2}$ and for j having values from 2 to $$4, V_{1,j} = \frac{W_{1,j}}{\sqrt{W_{1,1}}} \text{ then} \quad (14)$$

$$V = \begin{pmatrix} 0.86603 & -0.28868 & -0.28868 & -0.28868 \\ 0 & 0.8165 & 0 & 0 \\ 0 & 0 & 0 & 0 \end{pmatrix}.$$

Given that j includes values from 3 to 4, $$V_{2,j} := \frac{W_{2,j} - V_{1,2} \cdot V_{1,j}}{V_{2,2}}$$

and then $$V = \begin{pmatrix} 0.86602540 & -0.28867513 & -0.28867513 & -0.28867513 \\ 0.00000000 & 0.81649658 & -0.40824829 & -0.40824829 \\ 0.00000000 & 0.00000000 & 0.00000000 & 0.00000000 \end{pmatrix}. \quad (15)$$

Now $V_{3,3} := \sqrt{W_{3,3} - (V_{1,3})^2 - (V_{2,3})^2}$ so $$V = \begin{pmatrix} 0.86603 & -0.28868 & -0.28868 & -0.28868 \\ 0 & 0.8165 & -0.40825 & -0.40825 \\ 0 & 0 & 0.70711 & 0 \end{pmatrix}. \quad (16)$$

For j equal to 4 then $$V_{3,j} := \frac{W_{3,j} - (V_{1,3} \cdot V_{1,j}) - (V_{2,3} \cdot V_{2,j})}{V_{3,3}}$$

so the completed parity vector coefficient matrix becomes:

$$V = \begin{pmatrix} 0.86602540 & -0.28867513 & -0.28867513 & -0.28867513 \\ 0.00000000 & 0.81649658 & -0.40824829 & -0.40824829 \\ 0.00000000 & 0.00000000 & 0.70710678 & 0.70710678 \end{pmatrix}. \quad (17)$$

When the parity coefficient defining constraints are met the dot product of V and V transpose ($V^T$) are equal to the identity matrix and the dot product of V and H is a zero matrix as shown in equations (18) and (19). The parity coefficient matrix development shown here is identical for measurements from accelerometers and from gyros.

$$V \cdot V^T = \begin{pmatrix} 1 & 0 & 0 \\ 0 & 1 & 0 \\ 0 & 0 & 1 \end{pmatrix} \quad (18)$$

$$V \cdot H = \begin{pmatrix} 0 \\ 0 \\ 0 \end{pmatrix} \quad (19)$$

The parity vector is the dot product of V (equation (17)) and m (equation (1C)) written as:

$$p = V \cdot m. \quad (20)$$

At step 512, the magnitude squared of the parity vectors is dynamically calculated as the vehicle 20 moves and the inertial measurement units are continuously monitored. During the parity check, the magnitude squared of the parity vector is compared to the threshold. Thus as the inertial measurement units are sending data to the programmable processor, the programmable processor performs the calculations to determine the magnitude squared of the parity vectors and the threshold for the magnitude squared of the measurement and then compares them to each other in order to determine if one of the inertial measurement units has failed or is degrading.

The algorithm that is executed by the programmable processor in order to dynamically calculate the magnitude squared of the parity vectors is shown herein for the accelerometers. The gyros have a similar development which is not shown but which is understandable based on a reading of this specification by one of skill in the art.

Sensed acceleration in mounting frame for the $i^{th}$ inertial measurement unit (after sculling, size effect and lever arm correction to a common point) is:

$$f_{M\_measured_i} = \delta B_i + (I + \delta SF_i + \delta H_i) \cdot f_{M\_true_i} + \eta i \quad (21)$$

where $\eta i$ includes velocity readout noise and velocity random walk noise. The measured sensed acceleration in the mounting frame from the $i^{th}$ inertial measurement unit is true sensed acceleration plus error:

$$f_{M\_measured_i} = f_{M_i} + \delta f_{M_i} \quad (22)$$

The measurement vector to be formed using the four scalar measured sensed accelerations from inertial measurement units 100 (A-D) is $$m = \frac{1}{2} \cdot \begin{pmatrix} f_{M\_measured_a}^T \cdot f_{M\_measured_a} \\ f_{M\_measured_b}^T \cdot f_{M\_measured_b} \\ f_{M\_measured_c}^T \cdot f_{M\_measured_c} \\ f_{M\_measured_d}^T \cdot f_{M\_measured_d} \end{pmatrix} \quad (23)$$

Substituting equation (22) into equation (23) results in:

$$m = \frac{1}{2} \cdot \begin{bmatrix} (f_{M_a} + \delta f_{M_a})^T \cdot (f_{M_a} + \delta f_{M_a}) \\ (f_{M_b} + \delta f_{M_b})^T \cdot (f_{M_b} + \delta f_{M_b}) \\ (f_{M_c} + \delta f_{M_c})^T \cdot (f_{M_c} + \delta f_{M_c}) \\ (f_{M_d} + \delta f_{M_d})^T \cdot (f_{M_{da}} + \delta f_{M_d}) \end{bmatrix} \quad (24)$$

By expanding equation (24) and neglecting terms of order $\delta^2$ and noting that $f_{M_i}^T \cdot \delta f_{M_i} = \delta f_{M_i}^T \cdot f_{M_i}$ one obtains:

$$m = \frac{1}{2} \cdot \begin{pmatrix} (f_{M_A})^T \cdot f_{M_A} + 2 \cdot (f_{M_A})^T \cdot \delta f_{M_A} \\ (f_{M_B})^T \cdot f_{M_B} + 2 \cdot (f_{M_B})^T \cdot \delta f_{M_B} \\ (f_{M_C})^T \cdot f_{M_C} + 2 \cdot (f_{M_C})^T \cdot \delta f_{M_C} \\ (f_{M_D})^T \cdot f_{M_D} + 2 \cdot (f_{M_D})^T \cdot \delta f_{M_D} \end{pmatrix} \quad (25)$$

The parity vector is formed assuming no systematic errors (e.g., bias errors, scaling factors errors, and non-orthogonality) and assuming the elements of the parity vector have zero mean randomly distributed white noise.

Recalling equation (20), $p = V \cdot m$, and substituting equation (25) into equation (20), the parity vector is $$p = \begin{pmatrix} 0.866025 & -0.288675 & -0.288675 & -0.288675 \\ 0 & 0.816497 & -0.408248 & -0.408248 \\ 0 & 0 & 0.707107 & -0.707107 \end{pmatrix} \cdot \quad (26)$$

$$\left[ \frac{1}{2} \cdot \begin{pmatrix} (f_{M_A})^T \cdot f_{M_A} + 2 \cdot (f_{M_A})^T \cdot \delta f_{M_A} \\ (f_{M_B})^T \cdot f_{M_B} + 2 \cdot (f_{M_B})^T \cdot \delta f_{M_B} \\ (f_{M_C})^T \cdot f_{M_C} + 2 \cdot (f_{M_C})^T \cdot \delta f_{M_C} \\ (f_{M_D})^T \cdot f_{M_D} + 2 \cdot (f_{M_D})^T \cdot \delta f_{M_D} \end{pmatrix} \right]$$

Equation (26) is expanded as:

$$p = \begin{bmatrix} \begin{pmatrix} 0.866025 & -0.288675 & -0.288675 & -0.288675 \\ 0 & 0.816497 & -0.408248 & -0.408248 \\ 0 & 0 & 0.707107 & -0.707107 \end{pmatrix} \cdot \\ \frac{1}{2} \cdot \begin{pmatrix} (f_{M_A})^T \cdot f_{M_A} \\ (f_{M_B})^T \cdot f_{M_B} \\ (f_{M_C})^T \cdot f_{M_C} \\ (f_{M_D})^T \cdot f_{M_D} \end{pmatrix} \end{bmatrix} \ldots + \quad (27)$$

$$\begin{pmatrix} 0.866025 & -0.288675 & -0.288675 & -0.288675 \\ 0 & 0.816497 & -0.408248 & -0.408248 \\ 0 & 0 & 0.707107 & -0.707107 \end{pmatrix} \cdot$$

$$\frac{1}{2} \cdot \begin{pmatrix} 2 \cdot (f_{M_A})^T \cdot \delta f_{M_A} \\ 2 \cdot (f_{M_B})^T \cdot \delta f_{M_B} \\ 2 \cdot (f_{M_C})^T \cdot \delta f_{M_C} \\ 2 \cdot (f_{M_D})^T \cdot \delta f_{M_D} \end{pmatrix}$$

Note that the first term on the right is zero (parity coefficient matrix times truth sensed acceleration squared). This leaves the error:

$$p = \quad (28)$$

$$\begin{pmatrix} 0.866025 & -0.288675 & -0.288675 & -0.288675 \\ 0 & 0.816497 & -0.408248 & -0.408248 \\ 0 & 0 & 0.707107 & -0.707107 \end{pmatrix} \cdot \begin{pmatrix} f_{M_A}^T \cdot \delta f_{M_A} \\ f_{M_B}^T \cdot \delta f_{M_B} \\ f_{M_C}^T \cdot \delta f_{M_C} \\ f_{M_D}^T \cdot \delta f_{M_D} \end{pmatrix}$$

For compactness of notation, equation (28) is rewritten as equation (29), with the understanding that the quantities in the last term on the right are expressed in mounting frame coordinates. There are four individual triads (for example, 110 (A-D)) and working with scalar measurements (sensed measurements squared) from each inertial measurement unit 100 (A-D), the mounting frame is taken to be the mounting frame associated with each individual inertial measurement unit.

$$p = V \cdot \begin{pmatrix} f_A^T \cdot \delta f_A \\ f_B^T \cdot \delta f_B \\ f_C^T \cdot \delta f_C \\ f_D^T \cdot \delta f_D \end{pmatrix} \quad (29)$$

Note that the (2,1), (3,1) and (3,2) components of the V matrix (equation 17) are zero and expand equation 29 into components to obtain:

$$p_1 = V_{1,1} \cdot (f_A^T \cdot \delta f_A) + V_{1,2} \cdot (f_B^T \cdot \delta f_B) + V_{1,3} \cdot (f_C^T \cdot \delta f_C) + V_{1,4} \cdot (f_D^T \cdot \delta f_D)$$

$$p_2 = V_{2,2} \cdot (f_B^T \cdot \delta f_B) + V_{2,3} \cdot (f_C^T \cdot \delta f_C) + V_{2,4} \cdot (f_D^T \cdot \delta f_D)$$

$$p_3 = V_{3,3} \cdot (f_C^T \cdot \delta f_C) + V_{3,4} \cdot (f_D^T \cdot \delta f_D) \quad (30)$$

The fault detection function is the inner product of the parity vector:

$$D_F = (p_1)^2 + (p_2)^2 + (p_3)^2 \quad (31)$$

Equation 31 is the magnitude squared of the parity vector and this value is to be compared with the threshold for the magnitude squared of the measurement.

At step 514, the threshold for the magnitude squared of the measurement is dynamically calculated, in order to determine if an inertial measurement unit has failed or is degrading. The algorithm that is executed by the programmable processor in order to dynamically calculate the threshold is shown herein for the accelerometers. The gyros have a similar development which is not shown but which is understandable based on a reading of this specification by one of skill in the art.

The threshold is computed assuming the p vector elements are uncorrelated and using the expected value of the fault detection function as shown in equation (32):

$$E(D_F) = E[(p_1)^2] + E[(p_2)^2] + E[(p_3)^2] \quad (32)$$

Substituting equation (30) into equation (32), expanding, and assuming that the errors in inertial measurement unit 100 (A-D) are uncorrelated results in:

$$E(D_F) = (V_{1,1})^2 \cdot E[(f_A^T \cdot \delta f_A)^2] + \quad (33)$$
$$(V_{1,2})^2 \cdot E[(f_B^T \cdot \delta f_B)^2] + (V_{1,3})^2 \cdot E[(f_C^T \cdot \delta f_C)^2] +$$
$$(V_{1,4})^2 \cdot E[(f_D^T \cdot \delta f_D)^2] \ldots + [(V_{2,2})^2 \cdot E[(f_B^T \cdot \delta f_B)^2] +$$
$$(V_{2,3})^2 \cdot E[(f_C^T \cdot \delta f_C)^2] + (V_{2,4})^2 \cdot E[(f_D^T \cdot \delta f_D)^2]] \ldots$$
$$(V_{3,3})^2 \cdot E[((f_C)^T \cdot \delta f_C)^2] + (V_{3,4})^2 \cdot E[((f_D)^T \cdot \delta f_D)^2]$$

Expand one of the expected value terms on the right hand side of equation 33 in order to see the form of the expression. The subscripts 1, 2, and 3 refer to mounting frame axes, such as X, Y, and Z, for the inertial measurement unit, which is inertial measurement unit 100-A in equation (34):

$$E[(f_A^T \cdot \delta f_A)^2] = E[(f_{A1} \cdot \delta f_{A1} + f_{A2} \cdot \delta f_{A2} + f_{A3} \cdot \delta f_{A3})^2] \quad (34)$$

Expanding equation (34), taking the expected value, and assuming that the orthogonal mounting frame errors are uncorrelated with one another gives, $$E[(f_A^T \cdot \delta f_A)^2] = f_{A1}^2 \cdot E[(\delta f_{A1})^2] + f_{A2}^2 \cdot E[(\delta f_{A2})^2] + f_{A3}^2 \cdot E[(\delta f_{A3})^2]$$

Similarly for inertial measurement units 100 (B-D):

$$E[(f_B^T \cdot \delta f_B)^2] = f_{B1}^2 \cdot E[(\delta f_{B1})^2] + f_{B2}^2 \cdot E[(\delta f_{B2})^2] + f_{B3}^2 \cdot E[(\delta f_{B3})^2]$$

$$E[(f_C^T \cdot \delta f_C)^2] = f_{C1}^2 \cdot E[(\delta f_{C1})^2] + f_{C2}^2 \cdot E[(\delta f_{C2})^2] + f_{C3}^2 \cdot E[(\delta f_{C3})^2]$$

$$E[(f_D^T \cdot \delta f_D)^2] = f_{D1}^2 \cdot E[(\delta f_{D1})^2] + f_{D2}^2 \cdot E[(\delta f_{D2})^2] + f_{D3}^2 \cdot E[(\delta f_{D3})^2] \quad (35)$$

Substitution of equations (35) into equation (33) results in the form for the expected value of the detection function. This is the basis for the computation of the fault detection threshold:

$$E(D_F) = \quad (36)$$
$$(V_{1,1})^2 \cdot [F_{A1}^2 \cdot E[(\delta f_{A1})^2] + f_{A2}^2 \cdot E[(\delta f_{A2})^2] + f_{A3}^2 \cdot E[(\delta f_{A3})^2]] \ldots +$$
$$(V_{1,2})^2 \cdot [F_{B1}^2 \cdot E[(\delta f_{B1})^2] + f_{B2}^2 \cdot E[(\delta f_{B2})^2] + f_{B3}^2 \cdot E[(\delta f_{B3})^2]] \ldots +$$
$$(V_{1,3})^2 \cdot [F_{C1}^2 \cdot E[(\delta f_{C1})^2] + f_{C2}^2 \cdot E[(\delta f_{C2})^2] + f_{C3}^2 \cdot E[(\delta f_{C3})^2]] \ldots +$$
$$(V_{1,4})^2 \cdot [F_{D1}^2 \cdot E[(\delta f_{D1})^2] + f_{D2}^2 \cdot E[(\delta f_{D2})^2] + f_{D3}^2 \cdot E[(\delta f_{D3})^2]] \ldots +$$
$$(V_{2,2})^2 \cdot [F_{B1}^2 \cdot E[(\delta f_{B1})^2] + f_{B2}^2 \cdot E[(\delta f_{B2})^2] +$$
$$f_{A3}^2 \cdot E[(\delta f_{A3})^2]] \ldots + (V_{2,3})^2 \cdot$$
$$[F_{C1}^2 \cdot E[(\delta f_{C1})^2] + f_{C2}^2 \cdot E[(\delta f_{C2})^2] + f_{C3}^2 \cdot E[(\delta f_{C3})^2]] \ldots +$$
$$(V_{2,4})^2 \cdot [F_{D1}^2 \cdot E[(\delta f_{D1})^2] + f_{D2}^2 \cdot E[(\delta f_{D2})^2] +$$
$$f_{D3}^2 \cdot E[(\delta f_{D3})^2]] \ldots + (V_{3,3})^2 \cdot [F_{C1}^2 \cdot E[(\delta f_{C1})^2] +$$
$$f_{C2}^2 \cdot E[(\delta f_{C2})^2] + f_{C3}^2 \cdot E[(\delta f_{C3})^2]] \ldots + (V_{3,4})^2 \cdot$$
$$[F_{D1}^2 \cdot E[(\delta f_{D1})^2] + f_{D2}^2 \cdot E[(\delta f_{D2})^2] + f_{D3}^2 \cdot E[(\delta f_{D3})^2]]$$

The next step is to develop equation (36) considering bias, scale factor (SF), non-orthogonality (nonoth), readout noise (ro) and random walk errors (rw). The composite expected value of the detection function is shown in the next paragraph.

After including such errors, the composite expected value of the detection function becomes:

$$E(D_F) = E(D_{F\_bias}) + E(D_{F\_SF}) + E(D_{F\_nonorth}) + E(D_{F\_ro}) + E(D_{F\_rw}) \quad (37)$$

Equation 37 is expanded to form equation 38 when the actual values for the errors are written out for the sensed accelerations. Equation 38 is the expected value from the sensed acceleration and includes the velocity read out noise and the velocity random walk which are represented as $$\frac{\sigma_{VRO}}{\Delta t} \text{ and } \frac{\sigma_{VRW}^2}{\Delta t},$$

respectively.

$$E(D_{F\_sensed\_acceleration}) = [0.75 \cdot \sigma_{ABIAS}^2 \cdot (f_A^2 + f_B^2 + f_C^2 + f_D^2)] \quad (38)$$
$$\ldots + [0.75 \cdot \sigma_{ASF}^2 \cdot [(f_A)^4 + (f_B)^4 + (f_C)^4 + (f_D)^4]] \ldots +$$
$$0.75 \cdot \sigma_{accel\_nonorthog}^2 \cdot \begin{bmatrix} (f_{A1}^2 \cdot f_{A2}^2 + f_{A1}^2 \cdot f_{A3}^2 + f_{A2}^2 \cdot f_{A3}^2) \ldots + \\ (f_{B1}^2 \cdot f_{B2}^2 + f_{B1}^2 \cdot f_{B3}^2 + f_{B2}^2 \cdot f_{B3}^2) \ldots + \\ (f_{C1}^2 \cdot f_{C2}^2 + f_{C1}^2 \cdot f_{C3}^2 + f_{C2}^2 \cdot f_{C3}^2) \ldots + \\ (f_{D1}^2 \cdot f_{D2}^2 + f_{D1}^2 \cdot f_{D3}^2 + f_{D2}^2 \cdot f_{D3}^2) \end{bmatrix} \ldots +$$
$$0.75 \cdot \left(\frac{\sigma_{VRO}}{\Delta t}\right)^2 \cdot (f_A^2 + f_B^2 + f_C^2 + f_D^2) \ldots +$$
$$0.75 \cdot \frac{\sigma_{VRW}^2}{\Delta t} \cdot (f_A^2 + f_B^2 + f_C^2 + f_D^2)$$

Equation 37 is expanded to form equation 39 when the actual values for the errors are written out for the sensed rate. Equation 38 is the expected value for the sensed angular velocity and includes the angle readout noise and angle random walk which are represented as $$\frac{\sigma_{ARO}}{\Delta t} \text{ and } \frac{\sigma_{ARW}^2}{\Delta t},$$

respectively.

$$E(D_{F\_sensed\_rate}) = [0.75 \cdot \sigma^2_{GBIAS} \cdot (\omega_A^2 + \omega_B^2 + \omega_C^2 + \omega_D^2)] \quad (39)$$
$$\ldots + [0.75 \cdot \sigma^2_{GSF} \cdot [(\omega_A)^4 + (\omega_B)^4 + (\omega_C)^4 + (\omega_D)^4]] + $$
$$0.75 \cdot \sigma^2_{gyro\_nonoRthog} \cdot \begin{bmatrix} (\omega_{A1}^2 \cdot \omega_{A2}^2 + \omega_{A1}^2 \cdot \omega_{A3}^2 + \omega_{A2}^2 \cdot \omega_{A3}^2) \ldots + \\ (\omega_{B1}^2 \cdot \omega_{B2}^2 + \omega_{B1}^2 \cdot \omega_{B3}^2 + \omega_{B2}^2 \cdot \omega_{B3}^2) \ldots + \\ (\omega_{C1}^2 \cdot \omega_{C2}^2 + \omega_{C1}^2 \cdot \omega_{C3}^2 + \omega_{C2}^2 \cdot \omega_{C3}^2) \ldots + \\ (\omega_{D1}^2 \cdot \omega_{D2}^2 + \omega_{D1}^2 \cdot \omega_{D3}^2 + \omega_{D2}^2 \cdot \omega_{D3}^2) \end{bmatrix}$$
$$\ldots + 0.75 \cdot \left(\frac{\sigma_{ARO}}{\Delta t}\right)^2 \cdot (\omega_A^2 + \omega_B^2 + \omega_C^2 + \omega_D^2) \ldots +$$
$$0.75 \cdot \frac{\sigma^2_{ARW}}{\Delta t} \cdot (\omega_A^2 + \omega_B^2 + \omega_C^2 + \omega_D^2)$$

Equations (38) and (39) are the dynamically calculated thresholds for the acceleration and angular velocity, respectively. At step 518, if the magnitude of the parity vector is greater than the threshold, the programmable processor 210 determines that one of the inertial measurement units failed. The magnitude of the parity vector (equation (31)) is compared to the acceleration threshold (equation 38) if the acceleration was measured by the inertial measurement units. The magnitude of the parity vector (equation (31)) is compared to the angular velocity threshold (equation (39)) if the angular velocity was measured by the inertial measurement units.

If it was determined that an inertial measurement unit failed at step 518, then the programmable processor 210 determines a direction of the parity vector to determine which inertial measurement unit has failed.

The parity vector directions are written as:

$$\theta_1 = a\cos\left(\frac{p}{|p|} \cdot \frac{V^{(1)}}{V^{(1)}}\right), \quad (40)$$
$$\theta_2 = a\cos\left(\frac{p}{|p|} \cdot \frac{V^{(2)}}{V^{(2)}}\right),$$
$$\theta_3 = a\cos\left(\frac{p}{|p|} \cdot \frac{V^{(3)}}{V^{(3)}}\right), \text{ and}$$
$$\theta_4 = a\cos\left(\frac{p}{|p|} \cdot \frac{V^{(4)}}{V^{(4)}}\right).$$

The equation development shown above applies to unfiltered and filtered parity vector data. In the case of filtered parity data, the corresponding threshold is filtered in the same manner as the parity vector so that they remain coherent in time. The performance of each of the inertial measurement units (e.g., 100 (1-4)) is rank ordered based on the equations (40). The smallest theta angle ($\theta_i$) indicates the direction along which the parity vector lies. This direction identifies the worst performing inertial measurement unit. Conversely, the largest angle indicates the direction of the best performing inertial measurement unit.

Figure 6:
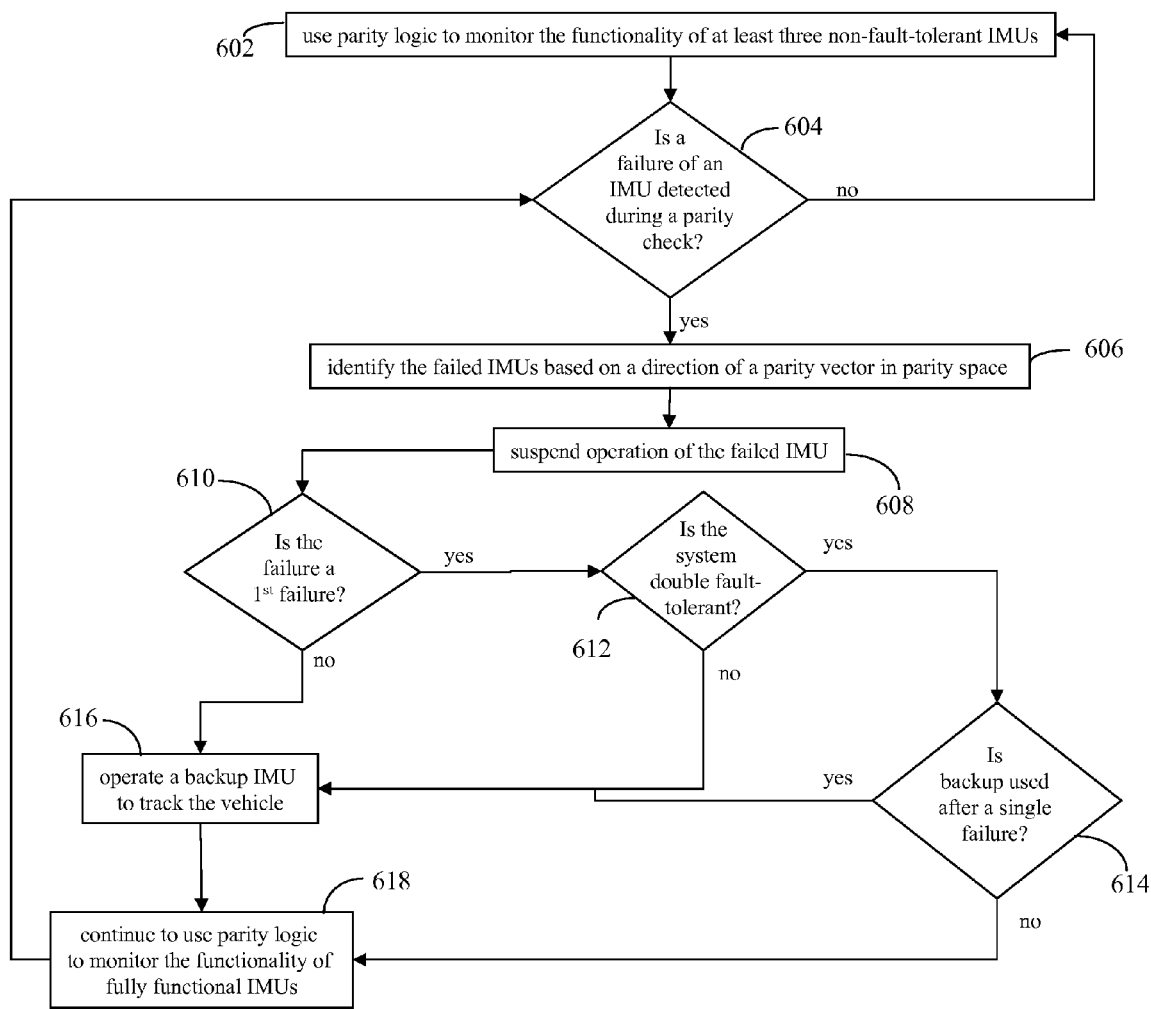
FIG. 6 is a flow diagram of one embodiment of a method to implement a fault-tolerant-avionic architecture in a vehicle in accordance with the present invention.

FIG. 6 is a flow diagram of one embodiment of a method 600 to use parity logic to monitor the functionality of at least three non-fault-tolerant inertial measurement units, each inertial measurement unit comprising at least one triad of sensors in accordance with the present invention. The method 600 describes how the programmable processor 210 operates when an inertial measurement unit fails.

The programmable processor 210 uses parity logic to monitor the functionality of at least three non-fault-tolerant inertial measurement units at step 602. At step 604, the programmable processor determines if a failure of an inertial measurement unit is detected during a parity check that is implemented as described above for method 500. If no inertial measurement unit has failed the flow proceeds back to 602 and the programmable processor continues to monitor the functionality of the inertial measurement units.

In one implementation of this embodiment, the programmable processor 210 uses parity logic to monitor the functionality of at least three non-fault-tolerant inertial measurement units only during critical-maneuver stages of the vehicle operation. For example, if the vehicle is a satellite, the inertial measurement units are all operating and monitored during ascent to orbit and re-entry since ascent to orbit and re-entry are critical-maneuver stages of the satellite operation and fault tolerance is essential. During the on-orbit coast of the exemplary satellite, the inertial measurement units may or may not be ON all the time, since the on-orbit coast of the satellite is a non-critical-maneuver stage. In one embodiment of this case, even when the inertial measurement units are ON they are not necessarily monitored the whole time they are ON. In another implementation of this embodiment, during the on-orbit coast or other non-critical-maneuver stages of a vehicle, only one of the inertial measurement units is ON some of the time after an assessment of the functionality of the inertial measurement units is completed. If only one of the inertial measurement units is ON, the parity check for the functionality of the inertial measurement units cannot be implemented since three or more inertial measurement units are required to monitor the functionality of the inertial measurement units using the parity check as described herein.

If one of the inertial measurement units has failed, the flow proceeds to step 606. At step 606, the programmable processor 210 identifies which of the three or four inertial measurement units have failed based on a direction of the parity vector in parity space as described above with reference to steps 518 and 520 of method 500 of FIG. 5. The programmable processor 210 suspends operation of the failed inertial measurement unit at step 608. At step 610, the programmable processor 210 determines if this failure is a first failure of the fault-tolerant-avionics system. At step 612, the programmable processor 210 determines if the fault-tolerant-avionics system is a double-fault-tolerant-avionics system or a single-fault-tolerant-avionics system.

If the failure is a first failure and the system is a double-fault-tolerant-avionics system, the programmable processor determines if a backup inertial measurement unit is to be used after a single failure at step 614. In one implementation of this embodiment, there is no backup inertial measurement unit to be used. In another implementation of this embodiment, the backup inertial measurement unit is only used if the vehicle is in a critical mode of operation.

If a backup inertial measurement unit is to be used after a single failure, the flow proceeds to step 616, and the programmable processor 210 operates the backup inertial measurement unit to track the vehicle 20. Then the flow proceeds to step 618 and the programmable processor 210 continues to use parity logic to monitor the functionality of the three remaining operational inertial measurement units.

If a backup inertial measurement unit is not to be used after a single failure, the flow proceeds to step 618, and the programmable processor 210 continues to use parity logic to monitor the functionality of the three remaining operational inertial measurement units. In one implementation of this embodiment, the programmable processor 210 continues to use parity logic to monitor the functionality of at least three non-fault-tolerant inertial measurement units based on an input from the vehicle master computer 200 that the vehicle 20 is in a critical-maneuver stage.

If the failure is a first failure and the system is a single-fault-tolerant-avionics system, the flow proceeds to step 616, and the programmable processor 210 operates the backup inertial measurement unit to track the vehicle 20. Then the flow proceeds to step 618 and the programmable processor 210 continues to use parity logic to monitor the functionality of the three remaining operational inertial measurement units.

If the failure is a second failure, the flow proceeds to step 616, and the programmable processor 210 operates the backup inertial measurement unit to track the vehicle 20. Then the flow proceeds to step 618 and the programmable processor 210 continues to use parity logic to monitor the functionality of the three remaining operational inertial measurement units.

From step 618, the flow proceeds back to step 604 and the programmable processor 210 proceeds through steps 606 to 618 if a failure is detected a second time.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor receives instructions and data from a read-only memory and/or a random access memory.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of implementing a fault-tolerant-avionic architecture in a vehicle comprising:
   using parity logic to monitor the functionality of at least three non-fault-tolerant inertial measurement units during a parity check, each inertial measurement unit comprising at least one triad of sensors;
   calculating a threshold from expected inertial measurement unit performance during a parity check; and
   if a failure of an inertial measurement unit is detected based on the calculated threshold, identifying the failed inertial measurement units based on a direction of a parity vector in parity space.

2. The method of claim 1, wherein the at least three inertial measurement units comprise four inertial measurement units, the method further comprising:
   suspending operation of the failed inertial measurement unit responsive to detecting the failure; and
   operating three fully functioning operational inertial measurement units to track the vehicle responsive to detecting the failure.

3. The method of claim 2, wherein the failure is a first failure and the failed inertial measurement unit is a first failed inertial measurement unit, the method further comprising:
   detecting a second failure of an inertial measurement unit.

4. The method of claim 3, further comprising:
   operating a backup inertial measurement unit in the fault tolerant-avionic architecture to track the vehicle responsive to the second inertial measurement unit failure; and
   continuing to use parity logic to monitor the functionality of operational measurement units including the backup inertial measurement unit.

5. The method of claim 1, further comprising:
   operating a backup inertial measurement unit in the fault tolerant-avionics architecture to track the vehicle responsive to the inertial measurement unit failure; and
   continuing to use parity logic to monitor the functionality of the operational inertial measurement units, including the backup inertial measurement unit.

6. The method of claim 1, wherein using parity logic to monitor the functionality of the at least three non-fault-tolerant inertial measurement units, comprises:
   receiving information indicative of measurements of one of acceleration, rate and both rate and acceleration from the inertial measurement units;
   forming measurement vectors based on a square of a magnitude of the received information indicative of measurements, wherein the measurement vectors are one of an acceleration vector, a rate vector and both the rate vector and the acceleration vector;
   transposing the measurement vectors in a measurement space into parity vectors in a parity space, the parity space being orthogonal to the measurement space; and
   dynamically calculating a magnitude squared of the parity vectors, and wherein calculating a threshold from expected inertial measurement unit performance comprises:
   dynamically calculating a threshold for the magnitude squared of the measurement, the method further comprising:
   comparing the magnitude squared of the parity vector to the threshold; and when a magnitude of a parity vector is greater than the threshold, determining a failure of an inertial measurement unit.

7. The method of claim 6, wherein identifying the failed inertial measurement unit comprises:
   determining a direction of the parity vector, wherein the parity vector points toward the failed inertial measurement unit.

8. The method of claim 7, the method further comprising:
   filtering the received information indicative of the measurements with one of a short time constant, a long time constant, and both the long time constant and the short time constant, wherein forming measurement vectors based on the square of the magnitude of the received information indicative of measurements, comprises forming measurement vectors based on a square of a magnitude of the filtered information indicative of measurements.

9. The method of claim 6, wherein the triad of sensors comprises a triad of accelerometers, and wherein receiving the information indicative of the measurements comprises:
   receiving information indicative of acceleration of the vehicle from the triad of accelerometers in each of the at least three inertial measurement units.

10. The method of claim 9, wherein the triad of sensors additionally comprises a triad of gyroscopes, and wherein receiving the information indicative of the measurements further comprises:
receiving information indicative of rate of the vehicle from the triad of gyroscopes in each of the at least three inertial measurement units.

11. The method of claim 6, wherein the triad of sensors comprises a triad of gyroscopes, and wherein receiving the information indicative of the measurements comprises:
receiving information indicative of rate of the vehicle from a triad of gyroscopes in each of the at least three inertial measurement units.

12. A program product comprising program instructions, embodied on a storage medium, that are operable to cause a programmable processor to:
receiving information indicative of measurements of one of acceleration, rate and both rate and acceleration from the inertial measurement units;
form measurement vectors based on a square of a magnitude of received information indicative of measurements, wherein the measurement vectors are one of acceleration-measurement vectors, rate-measurement vectors, and both acceleration-measurement vectors and rate-measurement vectors and wherein the sensed parameters are one of a sensed acceleration, a sensed velocity, and both the sensed acceleration and the sensed velocity;
transpose the measurement vectors in a measurement space into parity vectors in a parity space, the parity space being orthogonal to the measurement space; and
dynamically calculate a threshold for the magnitude squared of the sensed parameters;
compare the magnitude of the parity vectors to the threshold; when a magnitude of the parity vector is greater than the threshold, determine a failure of an inertial measurement unit; and
when the magnitude of the parity vector is greater than the threshold, determine a direction of the parity vector, wherein the parity vector points toward the failed inertial measurement unit.

13. The program product of claim 12, further comprising instructions operable to cause the programmable processor to:
filter the received information indicative of the measurements with one of a long time constant, a short time constant and both the short time constant and the long time constant.

14. The program product of claim 12, further comprising instructions operable to cause the programmable processor to:
read one of sensed acceleration and angular velocity measurements from each of non-fault tolerant inertial measurement units, sensed acceleration from each of non-fault tolerant inertial measurement units, and sensed angular velocity measurements from each of non-fault tolerant inertial measurement units.

15. The program product of claim 12, further comprising instructions operable to cause the programmable processor to:
compute parity vectors from the acceleration-measurement vectors; and
compute the parity vector direction for each parity vector having a magnitude that exceeds the threshold.

16. The program product of claim 12, further comprising instructions operable to cause the programmable processor to:
compute parity vectors from the rate-measurement vectors; and
compute parity vector direction for each parity vector having a magnitude that exceeds the threshold.

17. The program product of claim 12, further comprising instructions operable to cause the programmable processor to:
compute parity vectors from the acceleration-measurement vectors and the rate-measurement vectors; and
compute the parity vector direction for each parity vector having a magnitude that exceeds the threshold.

18. A system to implement a fault-tolerant-avionic architecture in a vehicle comprises:
means for using parity logic to monitor the functionality of at least three non-fault-tolerant inertial measurement units during a parity check, each inertial measurement unit comprising at least one triad of sensors;
means for calculating a threshold from expected inertial measurement unit performance during a parity check;
means for identifying the failed inertial measurement units based on a direction of a parity vector in parity space if a failure of an inertial measurement unit is detected based on the calculated threshold;
means for suspending operation of the failed inertial measurement unit responsive to detecting the failure; and
means for operating at least three fully functioning inertial measurement units to track the vehicle responsive to detecting the failure.

19. The system of claim 18, further comprising:
means for operating a backup inertial measurement unit in the fault tolerant-avionic architecture to track the vehicle responsive to at least one inertial measurement unit failure; and
means for continuing to use parity logic to monitor the functionality of fully functioning measurement units including the backup inertial measurement unit.

20. The system of claim 18, further comprising:
means for suspending the use of the parity logic to monitor the functionality of at least three non-fault-tolerant inertial measurement units based on an input that the vehicle is in a non-critical-maneuver stage; and
means for continuing to use parity logic to monitor the functionality of at least three non-fault-tolerant inertial measurement units based on an input that the vehicle is in a critical-maneuver stage.

* * * * *